(No Model.)

H. F. CAMPBELL.
METALLIC CIRCUIT.

No. 411,137. Patented Sept. 17, 1889.

Witnesses.
John F. C. Vreinkirk
Howard F. Eaton.

Inventor.
Henry F. Campbell,
by Crosby & Gregory Attys.

UNITED STATES PATENT OFFICE.

HENRY F. CAMPBELL, OF MALDEN, ASSIGNOR TO ALBERT C. POND, TRUSTEE, OF BOSTON, MASSACHUSETTS.

METALLIC CIRCUIT.

SPECIFICATION forming part of Letters Patent No. 411,137, dated September 17, 1889.

Application filed November 24, 1888. Serial No. 291,791. (No model.)

*To all whom it may concern:*

Be it known that I, HENRY F. CAMPBELL, of Malden, county of Middlesex, State of Massachusetts, have invented an Improvement in Metallic Circuits, of which the following description, in connection with the accompanying drawings, is a specification, like letters on the drawings representing like parts.

This invention has for its object to provide a novel metallic circuit especially adapted to be used in telephonic communication.

In accordance with my present invention two branches or wires of a metallic circuit are assembled or united together, as will be described, whereby induction from an extraneous source—such, for instance, as an electric-light circuit—is largely obviated, and whereby short-circuiting, due to capillary action, is prevented.

One branch or wire of my improved metallic circuit will be covered with a suitable insulation, which may be one of any of the well-known materials now commonly used, and the other wire or branch of the said circuit is left bare or indifferently insulated.

The insulated wire or branch of the metallic circuit may and preferably will be made of copper—such as a No. 18 wire—and the bare or indifferently-insulated wire may and preferably will be a No. 10 iron wire, or of such conductivity as will substantially balance the conductivity of the copper wire, the said iron wire imparting increased tensile strength to the circuit. The branches of the metallic circuit will preferably be held apart by a separator, herein shown as a wire, preferably of galvanized iron on account of its cheapness, the branches of the metallic circuit being bound or tied together throughout the length of the circuit by the said separator, the latter being preferably wound to separate the two branches of the circuit, to thus prevent short-circuiting of the metallic circuit by capillary action upon any moisture which might become lodged on the said wires.

My invention therefore consists in the combination, with a metallic circuit composed of two branches or wires $a\ a'$, the branch $a$ being an insulated conductor of high conductivity and the branch $a'$ an uninsulated wire of lower conductivity, of a bare wire wound or bound about the said branches throughout the length of the circuit to separate and yet bind the said branches, substantially as will be described.

Figure 1:
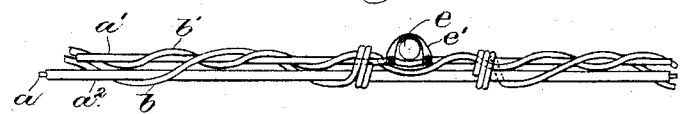
Figure 2:
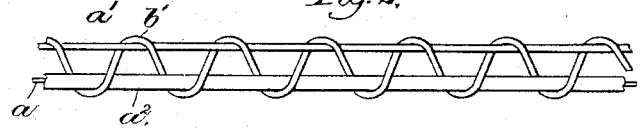
Figure 3:
Figure 4:
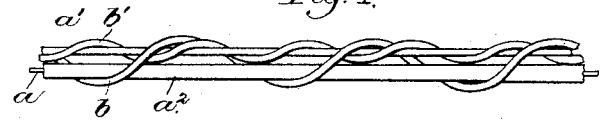

Figure 1 shows a sufficient portion of a metallic circuit embodying my invention to enable it to be understood, one separator and one binding-wire being shown, the bare conductor being connected to the insulator. Fig. 2 shows the two branches as parallel and held apart by the separator. Fig. 3 shows the bare wire or branch as wound or braided with the insulated branch or wire and the separator wound in reverse direction. Fig. 4 shows the bare wire wound spirally by the separator, and both secured or tied to the insulated wire by a binding-wire.

My improved metallic circuit is composed of two branches $a\ a'$, one branch, as $a$, being covered with insulation $a^2$ of any usual or well-known kind and the branch $a'$ being left bare. The insulated branch or wire $a$ may and preferably will be composed of copper—such, for instance, as No. 18 wire, of substantially small cross-section—and the bare wire or branch $a'$ may and preferably will be a No. 10 iron wire, of larger area in cross-section to obtain increased tensile strength, whereby the said wire or branches when united, as will be described, may be suspended from poles without sagging or breaking, the increased area of the iron wire compensating the high conductivity of the copper and effecting a balance in the circuit.

The branches $a\ a'$ of the metallic circuit will preferably be secured or bound together by an auxiliary wire $b$, wound about the said branches in any desired manner throughout the length of the circuit. The bare wire $a'$ may be held apart from the insulated wire by a separator $b'$, preferably a bare wire, as shown in Figs. 1 and 5, and the said wire $a'$ is then tied to the wire $a$ by the binding-wire $b$, the binding-wire $b$, as shown in Fig. 1, being a bare wire, and, as shown in Fig. 5, being an indifferently-insulated wire—that is, the insulation on the said binding-wire is very slight; or the wire $b'$ may perform the double office of separator and binder, as shown in Figs. 3 and 4, the insulated wire and separator being shown in Fig. 4 as wound in opposite directions.

In practice the separator holds the insulated wire from the bare wire, so that an air space or spaces are left between the said wires, whereby any moisture collected or deposited on the wires is prevented from lodging between the wires, but is permitted to pass off from the same—as, for instance, by the swaying or vibrating or ventilation of the wires. In this manner short-circuiting of the metallic circuit by capillary action is obviated.

In practice the metallic circuit will preferably be secured to the insulators $e$, of ordinary construction, by tie-wires $e'$, which are fastened to the bare wire, the binding-wire being rendered asunder at the insulators and having its ends wound around both branches, substantially as shown in Fig. 1. By this manner of securing the circuit to the insulators all danger of cutting into the insulation covering one branch wire is obviated and short-circuiting or leakage through the said wire prevented.

With my improved metallic circuit the number of poles and insulators employed is reduced one-half, thereby cheapening the cost of construction.

By the term "bare" wire, as hereinafter employed in the claims, I desire it to be understood as including an indifferently-insulated wire, as above described.

For reasons of economy I have made the copper branch of the metal circuit relatively of small cross-section to receive the principal part of the insulation depended upon in my method; but wires of equal size and of essentially equal cross-section, if separated by such mechanical methods as herein described, are included within the scope of my invention.

I have herein described the separator as a wire; but I do not desire to limit my invention to a wire, as a water-proof cord or other flexible water-proof material in the form of a tape or string comes within the scope of my invention.

I claim—

1. The combination, with a metallic circuit composed of two branches or wires $a\ a'$, the branch $a$ being an insulated conductor of high conductivity and the branch $a'$ an uninsulated wire of lower conductivity, of a bare wire wound or bound about the said branches throughout the length of the circuit to separate and yet bind the said branches, substantially as described.

2. The combination, with a metallic circuit composed of two branches or wires $a\ a'$, the branch $a$ being an insulated conductor of high conductivity and the branch $a'$ an uninsulated wire of lower conductivity, of a separator wound about one of the wires or branches and a bare wire wound about the said branches throughout the length of the circuit, substantially as described.

3. The combination, with a metallic circuit composed of two branches or wires $a\ a'$, the branch $a$ being an insulated conductor of high conductivity and small cross-section and the branch $a'$ an uninsulated wire of lower conductivity, but of larger cross-section to effect a balance in the metallic circuit, of a bare wire wound or bound about the said branches throughout the length of the circuit, substantially as described.

In testimony whereof I have signed my name to this specification, in the presence of two subscribing witnesses.

HENRY F. CAMPBELL.

Witnesses:
 JAS. H. CHURCHILL,
 M. RAY.